United States Patent [19]

Arrington

[11] 4,116,165

[45] Sep. 26, 1978

[54] MILKING LINER

[76] Inventor: Bradford Lee Arrington, 5 Hamilton Dr., Petaluma, Calif. 94952

[21] Appl. No.: 749,734

[22] Filed: Dec. 13, 1976

[51] Int. Cl.² .............................................. A01J 5/04
[52] U.S. Cl. .............................. 119/14.47; 119/14.49
[58] Field of Search ............... 119/14.47, 14.48, 14.49, 119/14.5, 14.51, 14.52, 14.36

[56] References Cited

U.S. PATENT DOCUMENTS

| | | |
|---|---|---|
| 1,959,581 | 5/1934 | Hapgood .......................... 119/14.49 |
| 2,120,556 | 6/1938 | Greene ............................. 119/14.49 |
| 3,659,557 | 5/1972 | Noorlander ...................... 119/14.47 |

*Primary Examiner*—Hugh R. Chamblee
*Attorney, Agent, or Firm*—Robert Charles Hill

[57] ABSTRACT

A milking liner for use with a milking machine has a tubular shape with a tapered reduced diameter teat receiving end portion. One embodiment of the invention has a tapered, reduced diameter teat receiving end portion in which the wall thickness steadily decreases as the diameter decreases.

3 Claims, 5 Drawing Figures

FIG. 4.
FIG. 5.
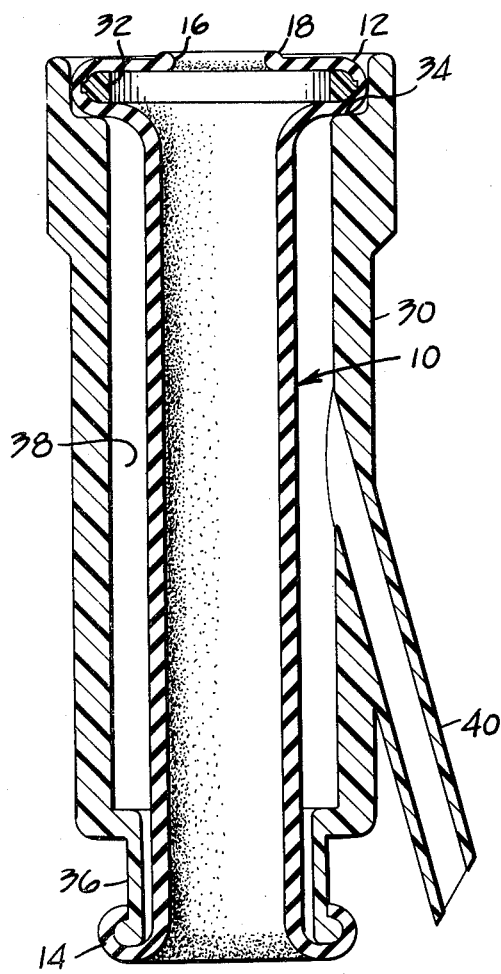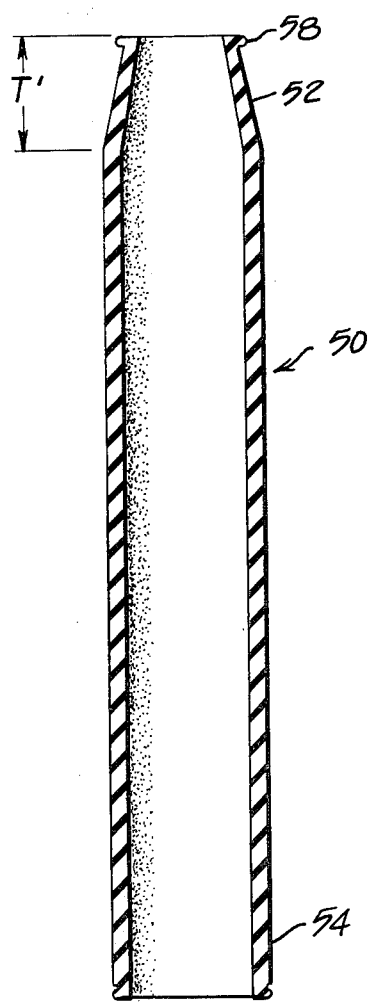

4,116,165

MILKING LINER

BACKGROUND OF THE INVENTION

This invention relates generally to milking machines and more particularly to a teat receiving milking liner or inflation for use with a milking machine of the vacuum pulsator type.

Prior art milking liners commonly used have been made from various rubber and rubber-like compounds formed in the shape of a tube which has a uniform inner diameter. In order to form a mouthpiece for receiving an animal teat a rigid ring member is inserted in one end of the liner and is of a much larger diameter than the diameter of the liner. The expansion of the liner at the teat receiving end with the ring in place causes rubber fatigue and deterioration so that the teat receiving end prematurely distorts in shape so that it will no longer properly stay on the teat or in many cases breaks down completely.

The milking liner of the present invention provides a teat receiving end portion which is tapered to a smaller diameter than the diameter of the main body portion of the tubular liner. A further embodiment of the invention provides a milking liner having a teat receiving end portion which is tapered to a reduced diameter and further has a steadily decreasing wall thickness throughout the length of the taper.

As a result of the novel design of the teat receiving end portion of the liner of the present invention there is a better fit with the animal teat than was possible with prior art liners.

Moreover, because the rubber in the reduced diameter portion seeks to return to its original reduced shape and size after the ring is removed, even with rubber fatigue caused by continuous usage, the liner still maintains an adequate fit on the animal teat.

A further object and advantage of the present invention resides in the fact that the reduced diameter and reduced wall thickness at the teat receiving end of the liner helps minimize the chances of the teat channel being choked off or of other causes of teat irritation and inflammation which can lead to the infectious condition known as mastitis.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING

FIG. 4 is a vertical longitudinal section showing the liner of the present invention in use with various other components of a milking machine.

FIG. 5 is a vertical longitudinal section of a modified embodiment of the present invention.

DESCRIPTION OF THE PREFERRED EMBODIMENTS

Figure 1:
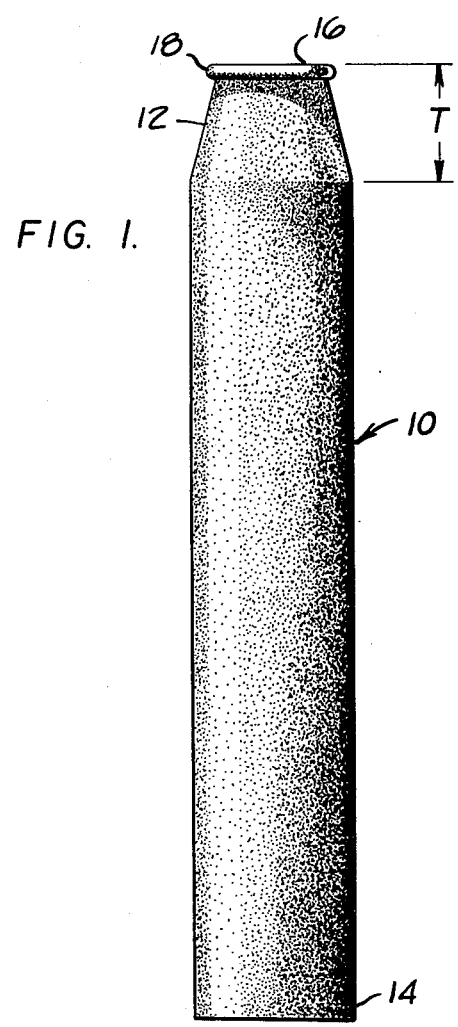
FIG. 1 is a detached elevational view of the new and improved milking liner of the present invention.
Figure 3:
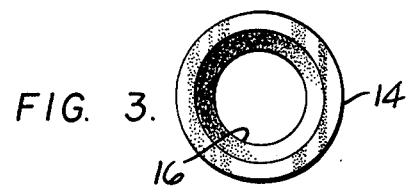
FIG. 3 is a bottom end view of the liner of the present invention.

Referring to FIG. 1, a tubular milking liner 10 is shown having a first end portion 12 and a second end portion 14. The liner 10 is made of a flexible elastic material, preferably rubber compounds having a synthetic or natural latex base which may utilize various curing agents and other ingredients to combat deterioration and fatigue, etc. The method of making liners is well-known in the art and is not part of the present invention.

Figure 2:
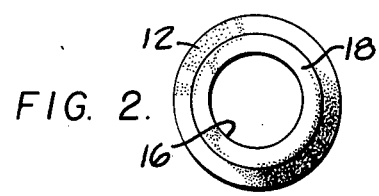
FIG. 2 is a top end view of the teat receiving end of the liner of the present invention.

As best shown in FIG. 2 in conjunction with FIG. 1, the first end 12 of the liner 10 has a conically tapered portion leading to a reduced diameter at the very outer end 16. The wall thickness of liner 10 in the embodiment shown in FIG. 1 is constant throughout the entire length of the liner and excellent results have been achieved using a wall thickness of $\frac{1}{8}$ inch. The inner diameter of the liner 10 is preferably 13/16 inch except for the end portion 12 where the diameter tapers down to a final diameter of 9/16 inch at the very outer end 16. The length T of the tapered portion is preferably about $\frac{3}{4}$ inch to $1\frac{1}{2}$ inches while the overall length of the liner 10 is preferably 5 inches to $6\frac{1}{2}$ inches, depending upon the length and shape of shell 30. In one form of liner 10 presently in use, the taper T is $\frac{3}{4}$ inch and the overall length is $6\frac{1}{4}$ inches. Preferably, a reinforcing lip 18 is provided in the form of a smoothly rounded bead. The lip 18 increases teat surface contact and increases the tendency of the reduced diameter end 16 to seek its original shape. The smaller diameter tapered end 12 greatly increases the useful life of the liner 10 because even with eventual rubber fatigue the end 12 will still provide an adequate fit on the cow teat.

As shown in FIG. 4, the liner 10 is prepared for use inside a casing or shell 30 by first inserting an expansion ring 32 inside the tapered end portion 12 of the liner. The insertion of the ring 32 is effect forms a mouthpiece to receive the teat and engage the cow udder. The insertion of the ring 32 expands the reduced diameter outer end 16 back toward the inner diameter of the main portion of the liner 10. However, unlike prior art liners of uniform diameter throughout, even with rubber fatigue (which is especially great in the area where the ring is inserted) a good fit is still maintained with the teat. In prior art liners, the rubber would fatigue much sooner and the inner diameter of the liner at the teat receiving end would distort badly resulting in a poor fit with the teat and eventually resulting in the liner falling off of the teat.

After the end portion 12 of the liner is expanded by insertion of the ring 32, the liner is inserted in the shell 30 so that the end 12 of the liner sealingly engages an enlarged shoulder portion 34 of the shell. The liner is then stretched lengthwise and the second or lower end 14 is turned upwardly and back over the bottom end 36 of the shell in sealed relation thereto so that a pressure chamber 38 is provided between the liner 10 and shell 30. As is well understood by those skilled in the art, in operation the teat of the animal passes through the reduced diameter portion 12 of the liner and is received in the mid-section 10 thereof. The liner is alternately expanded and contracted by variation of pressure in the chamber 38 placed in communication with a suitable pump by a hose connected to a pipe 40 formed in a side of the casing 30. A milk delivery tube connected to a suitable suction source then removes the milk from the bottom end 36 of the casing.

A modification of the invention which has shown superior results to the embodiment previously discussed is shown in FIG. 5. In FIG. 5 a tubular liner 50 is shown having a first end portion 52 and a second end portion 54. The liner 50 is similar to the liner 10 in most respects including the length (¾ inch) T' of the tapered end portion and the provision of a lip 58 similar to lip 18 of FIG. 1. An important improvement however is the provision of a steadily decreasing wall thickness throughout the length of the tapered end portion 52. This decrease in wall thickness at the tapered end provides less restricting contact with the animal teat and reduces the chance of the teat streak channel being choked off. Best results over a ¾ inch taper length have been obtained by steadily decreasing the wall thickness from ⅛ inch to from 3/32 to 1/16 inch at the very outer end. In general, the relationship is that the wall thickness should decrease in direct relationship with a decrease in diameter.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:
1. A milking liner for use with a milking machine having a rigid outer casing, said casing having a shouldered enlargement at one end, said liner comprising:
   (a) a tube of elastic material having a wall thickness of ⅛ inch, said tube adapted to fit longitudinally within said casing, a main body portion of said tube having a uniform diameter,
   (b) a first end of said tube having a conically tapered decreased diameter portion, the inner diameter of which tapers from 13/16 inch to 9/16 inch,
   (c) a smoothly rounded external bead on the outer end of said first end,
   (d) said first end of said tube adapted to be received in the enlarged shoulder portion of the casing when said first end is expanded by the insertion of a rigid ring member therein,
   (e) said wall thickness of the first end of said tube decreasing along said tapered portion from an initial thickness of ⅛ inch to a final thickness of from 3/32 inch to 1/16 inch.
2. A milking liner as set forth in claim 1 wherein the length of the taper is from ¾ inch to 1½ inches.
3. A milking liner as set forth in claim 2 wherein the overall length of said tube is 6¼ inches.